United States Patent [19]

Kishida et al.

[11] Patent Number: 4,755,559

[45] Date of Patent: Jul. 5, 1988

[54] THERMOPLASTIC RESIN COMPOSITION OF A POLYCARBONATE AND A VINYL AROMATIC-VINYL CYANIDE MONOMERS/DIENE RUBBER GRAFT COPOLYMER

[75] Inventors: Kazuo Kishida, Hiroshima; Hiroshi Kawasaki, Yokohama; Hideyuki Shigemitsu, Ohtake, all of Japan

[73] Assignee: Mitsubishi Rayon Company Limited, Tokyo, Japan

[21] Appl. No.: 806,467

[22] Filed: Dec. 9, 1985

[30] Foreign Application Priority Data

Dec. 27, 1984 [JP] Japan .................. 59-281256

[51] Int. Cl.[4] ........................................ C08L 69/00
[52] U.S. Cl. ...................................... 525/67; 525/69; 525/147; 525/148
[58] Field of Search .................... 525/67, 146, 69, 80, 525/147

[56] References Cited

U.S. PATENT DOCUMENTS

| | | | |
|---|---|---|---|
| 4,518,742 | 5/1985 | Muramatsu et al. | 525/67 |
| 4,560,725 | 12/1985 | Van Bokhoven et al. | 525/67 |
| 4,564,654 | 1/1986 | Serini et al. | 525/67 |

FOREIGN PATENT DOCUMENTS 0051336 12/1982 European Pat. Off. .
1604656 3/1972 France .

*Primary Examiner*—Theodore E. Pertilla
*Attorney, Agent, or Firm*—Oblon, Fisher, Spivak, McClelland & Maier

[57] ABSTRACT

A thermoplastic resin composition comrpising:
(A) from 5 to 50 parts by weight of a graft copolymer obtained by graft polymerizing from 20 to less than 40 parts by weight of monomers comprising from 20 to 80% by weight of an α-alkyl aromatic vinyl monomer, from 3 to 40% by weight of an aromatic vinyl monomer containing no α-alkyl aromatic vinyl monomer, from 15 to 40% by weight of a vinyl cyanide monomer and from 0 to 35% by weight of a vinyl monomer copolymerizable with these monomers, to from more than 60 to 80 parts by weight of a diene rubber-like polymer, the total amount of the monomers and the rubber-like polymer being 100 parts by weight;
(B) from 0 to 60 parts by weight of a copolymer obtained by polymerizing from 60 to 90% by weight of an aromatic vinyl monomer, from 10 to 40% by weight of a vinyl cyanide monomer and from 0 to 30% by weight of a vinyl monomer copolymerizable with these monomers; and
(C) from 15 to 80 parts by weight of a polycarbonate resin;
the total amount of components (A), (B) and (C) being 100 parts by weight. The composition is useful for making molded products.

12 Claims, No Drawings

THERMOPLASTIC RESIN COMPOSITION OF A POLYCARBONATE AND A VINYL AROMATIC-VINYL CYANIDE MONOMERS/DIENE RUBBER GRAFT COPOLYMER

The present invention relates to a thermoplastic resin composition having excellent heat resistance, impact resistance and platability. More particularly, the present invention relates to such a thermoplastic resin composition comprising a specific graft copolymer and a polycarbonate resin.

Rubber-modified thermoplastic resins represented by an ABS resin and high impact polystyrene are widely used as thermoplastic resin compositions having excellent impact resistance. However, these resin compositions lack in heat resistance, and their use at a relatively high temperature at a level of higher than 90° C. has been restricted. Various proposals have been made to improve the heat resistance of the ABS resin. For instance, Japanese Examined Patent Publications Nos. 18194/1960 and 60373/1982 disclose that resin compositions having excellent heat resistance can be obtained by blending a copolymer of α-methylstyrene with acrylonitrile to the ABS resin.

Further, methods of blending polycarbonate resins to ABS resins are disclosed in Japanese Examined Patent Publications Nos. 15225/1963, 27579/1980, 21530/1982, 12300/1983 and 46269/1983 and Japanese Unexamined Patent Publications Nos. 40536/1982, 149938/1983 and 12047/1982.

However, in general, the impact strength tends to deteriorate when a copolymer of α-methylstyrene with acrylonitrile is blended to the ABS resin as mentioned above, and the resulting resin composition can not be used as the conventional ABS resin. On the other hand, in above-mentioned methods of blending polycarbonate resins to the ABS resins, no adequate balance for the heat resistance, impact resistance, platability, moldability and costs is obtainable although no deterioration in the impact strength is observed in the resulting resin compositions. For instance, according to the method disclosed in Japanese Examined Patent Publication No. 46269/1983, styrene and acrylonitrile are used as graft monomers, and accordingly, there is a difficulty that the styrene-acrylonitrile copolymer contained in the graft copolymer reduces the heat resistance. Likewise, in the method disclosed in Japanese Examined Patent Publication No. 21530/1982, styrene and acrylonitrile are used as graft monomers like in the case of Japanese Examined Patent Publication No. 46269/1983 and the particle size of the graft copolymer is specified to be from 0.05 to 0.19 μm, whereby difficulties exist with respect to the heat resistance, impact resistance and platability.

The present inventors have conducted extensive researches to solve the above problems, and as a result, have found it possible to obtain a thermoplastic resin having excellent heat resistance, impact resistance and platability by blending a graft copolymer having a high rubber content and containing an α-alkyl aromatic vinyl monomer as a graft monomer, with a polycarbonate resin. The present invention has been accomplished on the basis of this discovery.

Namely, present invention provides a thermoplastic resin composition comprising:

(A) from 5 to 50 parts by weight of a graft copolymer obtained by graft polymerizing from 20 to less than 40 parts by weight of monomers comprising from 20 to 80% by weight of an α-alkyl aromatic vinyl monomer, from 3 to 40% by weight of an aromatic vinyl monomer containing no α-alkyl aromatic vinyl monomer, from 15 to 40% by weight of a vinyl cyanide monomer and from 0 to 35% by weight of a vinyl monomer copolymerizable with these monomers, to from more than 60 to 80 parts, such as 63 to 80 parts, by weight of a diene rubber-like polymer, the total amount of the monomers and the rubber-like polymer being 100 parts by weight;

(B) from 0 to 60 parts, such as 10 to 60 parts, by weight of a copolymer obtained by polymerizing from 60 to 90% by weight of an aromatic vinyl monomer, from 10 to 40% by weight of a vinyl cyanide monomer and from 0 to 30% by weight of a vinyl monomer copolymerizable with these monomers; and (C) from 15 to 80 parts by weight of a polycarbonate resin;

the total amount of components (A), (B) and (C) being 100 parts by weight.

Now, the present invention will be described in detail with reference to the preferred embodiments.

In the present invention, the graft copolymer (A) is obtained by graft polymerizing from 20 to less than 40 parts, such as 20 to 37 parts, by weight of monomers comprising from 20 to 80% by weight of an α-alkyl aromatic vinyl monomer, from 3 to 40% by weight of an aromatic vinyl monomer containing no α-alkyl aromatic vinyl monomer, from 15 to 40% by weight of a vinyl cyanide monomer and from 0 to 35% by weight of a vinyl monomer copolymerizable with these monomers, to from more than 60 to 80 parts, such as 63 to 80 parts, by weight of a diene rubber-like polymer, the total amount of the monomers and the rubber-like polymer being 100 parts by weight.

As the diene rubber-like polymer, polybutadiene, a butadiene-styrene copolymer, or a butadiene-acrylonitrile copolymer may be mentioned. These polymers may be used either alone or in combination as a mixture of two or more different kinds. If the amount of the diene rubber-like polymer in the graft copolymer (A) is 60 parts by weight or less, the weld strength of a molded product obtained from the resin composition thereby obtained will be poor as the rubber particles will be too little in the weld portion of the molded product. On the other hand, if the amount exceeds 80 parts by weight, coagulation of the rubber-like polymer is likely to take place, whereby the platability or other physical properties tend to deteriorate.

As the α-alkyl aromatic vinyl monomer among the monomers for the grafting, α-methylstyrene or a halogenated α-methylstyrene may be employed. If the α-alkyl aromatic vinyl monomer is less than 20% by weight in the total graft monomers, the improvement in the heat resistance will be inadequate. On the other hand, if the amount exceeds 80% by weight, the chemical resistance and impact resistance tend to deteriorate.

As the aromatic vinyl monomer containing no α-alkyl aromatic vinyl monomer, styrene, vinyltoluene, etc. may be mentioned. If the amount is less than 3% by weight in the total graft monomers, no adequate impact resistance will be obtained, and if it exceeds 40% by weight, the heat resistance tends to deteriorate.

As the vinyl cyanide monomer, acrylonitrile, methacrylonirile, etc. may be mentioned. If the amount is less than 15% by weight in the total graft monomers, the chemical resistance will be inadequate, and if it exceeds 40% by weight, the impact resistance will be poor.

As the vinyl monomer copolymerizable with these monomers, methyl methacrylate, ethyl methacrylate, etc. may be mentioned. This monomer may be used within a range of up to 35% by weight in the total graft monomers, as the case requires.

Graft copolymers (A) may be used either alone or in combination as a mixture of two or more different kinds.

The proportion of the graft copolymer (A) in 100 parts by weight of the thermoplastic resin composition of the present invention, is from 5 to 50 parts by weight. If the proportion of the graft copolymer (A) is less than 5 parts by weight, the platability and the impact resistance will be poor, and if it exceeds 50 parts by weight, the heat resistance tends to deteriorate.

The above-mentioned graft copolymer (A) may be prepared by emulsion polymerization, emulsion-suspension polymerization or continuous bulk polymerization. The polymerization can be conducted by adding the total amount of the graft monomer mixture in the presence of the diene rubber-like polymer at once, continuously or non-continuously. Further, the graft polymerization can be conducted in a single stage operation or multi-stage operation. Furthermore, a suitable procedure may be optionally selected, for instance, by graft polymerizing one of the graft monomers in the first step, and graft polymerizing the rest of the graft monomers in the second or subsequent steps. For instance, in the case where the impact resistance is particularly required, styrene and acrylonitrile may be graft polymerized to the rubber-like polymer in the first step, and then α-methylstyrene and acrylonitrile may be graft polymerized in the second step.

The copolymer (B) is obtained by polymerizing from 60 to 90% by weight of an aromatic vinyl monomer, from 10 to 40% by weight of a vinyl cyanide monomer and from 0 to 30% by weight of a vinyl monomer copolymerizable with these monomers.

As the aromatic vinyl monomer, styrene, α-methylstyrene, vinyltoluene, etc. may be mentioned. When the heat resistance is particularly required, it is preferred to use α-methylstyrene. The vinyl cyanide monomer and the copolymerizable vinyl monomer may be the same as the monomers as used for the graft copolymer (A). Among them, if the amounts of the aromatic vinyl monomer and the vinyl cyanide monomer are outside the above-mentioned ranges, the chemical resistance and impact resistance tend to deteriorate as in the case of the graft copolymer (A).

The copolymers (B) may be incorporated either alone or in combination as a mixture of two or more different kinds, for the purpose of improving the moldability. The proportion of the copolymer (B) is up to 60 parts by weight in 100 parts by weight of the total resin composition. If the proportion exceeds 60 parts by weight, the impact resistance tends to deteriorate. The copolymer (B) may be obtained by emulsion polymerization, suspension polymerization or continuous bulk polymerization.

The polycarbonate resin (C) in the present invention is obtainable from a dihydroxydiarylalkane, and may be optionally branched. The polycarbonate resin may be prepared by a conventional method, and is usually prepared by reacting a dihydroxy or polyhydroxy compound with phosgene or a diester of carbonic acid. Suitable dihydroxydiarylalkanes include those having an alkyl group, a chlorine atom or a bromine atom at the ortho position relative to the hydroxy groups. Preferred specific dihydroxydiarylalkanes include 4,4'-dihydroxy-2,2-diphenylpropane (bisphenol A), tetramethylbisphenol A and bis-(A-hydroxyphenyl)-p-diisopropylbenzene. The branched polycarbonate may be prepared, for instance, by substituting a part, e.g. from 0.2 to 2 mol %, of the dihydroxy compound by a polyhydroxy compound. Specific polyhydroxy compounds include 1,4-bis-(4', 4,2'-dihydroxytriphenylmethyl)-benzene, fluoroglucinol, 4,6-dimethyl-2,4,6-tri-(4-hydroxyphenyl)heptene-2, 4,6-dimethyl-2,4,6-tri-(4-hydroxyphenyl)heptane, 1, 3, 5-tri-(4-hydroxyphenyl)-benzene, 1,1,1-tri(4-hydroxyphenyl)-ethane and 2,2-bis[4,4-(4,4'-dihydroxyphenyl) -cyclohexyl]-propane.

The above polycarbonate resins (C) may be used either alone or in combination as a mixture of two or more different kinds. The proportion of the polycarbonate resin (C) is from 15 to 80 parts by weight in 100 parts by weight of the total resin compositon. If the proportion is less than 15 parts by weight, the impact resistance and heat resistance will be inadequate, and if it exceeds 80 parts by weight, the moldability and platability will be poor, and the cost increases.

For the preparation of the thermoplastic resin composition of the present invention, it is possible to use an apparatus which is commonly used for blending resins, such as a Henschel mixer or a tumbler. Likewise, for shaping, a conventional apparatus commonly used for the shaping such as a single screw extruder, a double screw extruder or a Bumbury's mixer may be employed.

Further, various additives may also be incorporated to the thermoplastic resin composition of the present invention for the purpose of improving various properties such as the stability against the thermal decomposition and hydrolysis, and antistatic properties during the mixing and pelletizing operation.

Now, the present invention will be described in further detail with reference to Examples. However, it should be understood that the present invention is by no means restricted to these specific Examples.

In the Examples and Comparative Examples, "parts" and "%" mean "parts by weight" and "% by weight".

In the following Examples and Comparative Examples, the physical properties were determined in accordance with the following methods.

Izod impact strength:
Measured in accordance with ASTM D-256.
Heat distortion temperature:
Measured in accordance with ASTM D-648 under a load of 18.56 kg/cm$^2$.
Adhesive strength of the plated layer:
Onto a shaped product of 50×90×3 mm molded at a mold temperature of 70° C. under the minimum injection rate, plating was applied under the following plating conditions to from a plated layer. Cut lines were engraved on the plated layer with a width of 2.5 cm, and the plated layer was pulled up vertically, whereupon the force required for peeling was calculated for a width of 1 cm.

Plating conditions

Etching ($CrO_2$ 400 g/liter/$H_2SO_4$: 20% by volume), treatment at 60° C. for 15 minutes Acid treatment (HCl: 10% by volume), treatment at room temperature for one minute treatment Catalyzer ("Catalyst A-30", manufactured by Okuno Seiyaku Kogyo K.K.), dipping at 20° C. for 2 minutes Accelerator ($H_2SO_4$: 10% by volume), dipping at 40° C. for 3 minutes.

Electroless copper plating ("N-100", manufactured by Okuno Seiyaku Kogyo K.K.), dipping at 30° C. for 10 minutes.

Electrolytic copper plating (copper sulfate: 200 g/liter, $H_2SO_4$: 50 g/liter; gloss agent ("Cupracid", manufactured by Schering Corp.) 1 ml/liter), dipping at 20° C. for 60 minutes at a current density of 4 A/dm$^2$.

After baking (80° C. for 2 hours), the test sample was left to cool for 1 hour, and then subjected to the test.

Thermal cycle test of the plated layer:

Onto a shaped product of 100×100×3 mm molded at a mold temperature of 70° C. at the maximum injection rate, plating was applied under the following plating conditions. The plated product was subjected to a three-cycle test with each cycle being −35° C. for 1 hour→room temperature for 15 minutes→90° C. for 1 hour →room temperature for 15 mintues, whereupon the presence or absence of the swelling of the plated layer was observed.

Plating conditions

Etching ($CrO_2$ 400 g/liter/$H_2SO_4$: 15% volume), treatment at 60° C. for 15 minutes Acid treatment (HCl: 10% by volume), treatment at room temperature for 1 minute Catalyzer ("Catalyst A-30", manufactured by Okuno Seiyaku Kogyo K.K.), treatment at 20° C. for 2 minutes Accelerator ($H_2SO_4$: 10% by volume), treatment at 40° C. for 3 minutes Electroless nickel plating ("TMP", manufactured by Okuno Seiyaku Kogyo K.K.), treatment at 35° C. for 5 minutes.

Electrolytic copper plating, dipping at 20 ° C. for 20 minutes at a current density of 4 A/dm$^2$.

Electrolytic nickel plating, dipping at 55° C. for 15 minutes at a current density of 3.5 A/dm$^2$.

Electrolytic chromium plating, dipping at 45° C. for 2 minutes at a current density of 15 A/dm$^2$ Weld strength:

By using a test specimen (for UL-94 burning test) having a size of 1/12 inch in thickness×½ inch in width×5 inch in length, gates were provided at both sides in the direction of the length of 5 inch to provide a weld at the center, and a test piece having a size of 1/12 inch×15 mm×½ inch was cut out so that the weld portion will be the breaking center. And the Dynstat impact strength of the test piece was measured.

EXAMPLES 1 to 5, and COMPARATIVE EXAMPLES 1 to 7

(1) Preparation of a graft copolymer (ABS-1)

70 parts by weight (as solid content) of polybutadiene latex having a solid content of 50% by weight, 1.8 parts by weight of acrylonitrile, 3 parts by weight of styrene and 0.2 part of t-dodecylmercaptan were added to a reactor containing 150 parts by weight of water and 2.0 parts by weight of a wood rosin emulsifier, 0.5 part of dextrose, 0.2 part by weight of EDTA and 0.01 part by weight of ferrous sulfate.

The temperature of the reactor was raised to 60° C., and 0.2 part by weight of cumene hydroperoxide was added to initiate the polymerization. When the temperature in the reactor passed the maximum point and lowered to 65° C., a mixture comprising 7.2 parts by weight of acrylonitrile, 18 parts by weight of α-methylstyrene, 0.5 part by weight of t-dodecylmercaptan and 0.6 part by weight of cumene hydroperoxide, was continuously dropwise added over a period of 50 minutes. After the temperature in the reactor passed the maximum point, the reactor was left to cool for 1 hour. Then, the graft copolymer latex thereby obtained, was coagulated with dilute sulfuric acid, washed, filtered and dried.

(2) Preparation of a graft copolymer (ABS-2)

The same process as used for the preparation of ABS-1 was employed except that the amounts of the graft monomers were changed as shown in Table 1.

(3) Preparation of a graft copolymer (ABS-3)

The same process as used for the preparation of ABS-1 was employed except that the amounts of the graft monomers were changed as shown in Table 1.

(4) Preparation of a graft copolymer (ABS-4)

The same process as used for the preparation of ABS-1 was employed except that the amount of polybutadiene latex was changed to 30 parts by weight and the amounts of the graft monomers were changed as shown in Table 1.

The copolymers thus obtained were blended with an acrylonitrile-α-methylstyrene copolymer obtained by separate polymerization and a polycarbonate resin ("S-2000", tradename, Mitsubishi Gas Chemical Co., Ltd.) in the proportions as identified in Table 1, and the blends were mixed by a Henschel mixer for 4 hours, and then pelletized by a 40 mm single screw extruder. Various physical properties were measured with respect to these pellets, and evaluated by the above-mentioned methods. The results are also shown in Table 1.

TABLE 1

| | | | Example 1 | Example 2 | Example 3 | Example 4 | Example 5 | Comparative Example 1 | Comparative Example 2 |
|---|---|---|---|---|---|---|---|---|---|
| Graft copolymers | | | | | | | | | |
| ABS-1 | Graft monomers 30 parts | Graft monomers for 1st step 4.8 parts / AN 1.8 parts / St 3 parts; Graft monomers for 2nd step 25.2 parts / AN 7.2 parts / α-MS 18 parts | 20% | — | 10% | 10% | 40% | — | — |
| ABS-2 | Graft monomers 30 parts | Graft monomers for 1st step 15 parts / AN 4.5 parts / St 10.5 parts; Graft monomers for 2nd step 15 parts / AN 4.5 parts / α-MS 10.5 parts | — | 20% | 10% | — | — | — | — |
| ABS-3 | Graft monomers 30 parts | Graft monomers for 1st step 25.8 parts / AN 7.8 parts / St 18 parts; Graft monomers for 2nd step 4.2 parts / AN 1.2 parts / α-MS 3 parts | — | — | — | — | — | 20% | — |
| ABS-4 | Graft monomers 70 parts | Graft monomers for 1st step 35 parts / AN 10.5 parts / St 24.5 parts; Graft monomers for 2nd step 35 parts / AN 10.5 parts / α-MS 24.5 parts | — | — | — | — | — | — | 20% |
| Copolymers | | | | | | | | | |
| AS-1 | Acrylonitrile 22% / α-Methylstyrene 78% | | 30% | 30% | 10% | 40% | 20% | 30% | 30% |
| AS-2 | Acrylonitrile 50% / α-Methylstyrene 50% | | — | — | — | — | — | — | — |
| Polycarbonate resin | | | 50% | 50% | 70% | 50% | 40% | 50% | 50% |
| Physical properties | | | | | | | | | |
| Izod impact strength (kg-cm/cm) | | | 35 | 40 | 46 | 30 | 43 | 52 | 20 |
| Heat distortion temperature (°C) | | | 130 | 125 | 131 | 133 | 123 | 110 | 120 |
| Adhesive strength of plated layer (Kgf/cm) | | | 1.5 | 1.7 | 1.5 | 1.0 | 1.5 | 1.5 | 0.6 |
| Thermal cycle test of plated layer | | | O | O | O | O | O | O | X |
| Weld strength (kg-cm/cm) | | | 22 | 25 | 40 | 19 | 30 | 27 | 3 |

| | | | Comparative Example 3 | Comparative Example 4 | Comparative Example 5 | Comparative Example 6 | Comparative Example 7 |
|---|---|---|---|---|---|---|---|
| Graft copolymers | | | | | | | |
| ABS-1 | Polybutadiene 70 parts | Graft monomers 30 parts | 20% | 3% | 60% | 20% | 5% |
| ABS-2 | Polybutadiene 70 parts | Graft monomers 30 parts | — | — | — | — | — |
| ABS-3 | Polybutadiene 70 parts | Graft monomers 30 parts | — | — | — | — | — |
| ABS-4 | Polybutadiene 30 parts | Graft monomers 70 parts | — | — | — | — | — |
| Copolymers | | | | | | | |

TABLE 1-continued

| | | | | | | |
|---|---|---|---|---|---|---|
| AS-1 | Acrylonitrile | 22% | — | — | 15% | 75% | 5% |
| | α-Methylstyrene | 78% | — | — | — | — | — |
| AS-2 | Acrylonitrile | 50% | 30% | 47% | — | — | — |
| | α-Methylstyrene | 50% | — | — | — | — | — |
| Polycarbonate resin | | — | 50% | 50% | 35% | 5% | 90% |
| Physical properties | | | | | | | |
| Izod impact strength (kg-cm/cm) | | 40 | 10 | 37 | 20 | 30 | |
| Heat distortion temperature (°C.) | | 110 | 134 | 110 | 120 | 128 | |
| Adhesive strength of plated layer (Kfg/cm) | | 1.5 | 0.2 | 0.9 | 1.0 | 0.3 | |
| Thermal cycle test of plated layer | | O | X | X | O | X | |
| Weld strength (kg-cm/cm) | | 24 | 7 | 35 | 7 | 30 | |

Note:
AN: Acrylonitrile, St: Styrene, α-Ms: α-Methylstyrene
O: No swelling of the plated layer observed.
X: Swelling of the plated layer observed.

The thermoplastic resin compositions of the present invention have the above described compositions, and a high rubber content, whereby the influence of the graft monomers can be minimized, and they have excellent heat resistance, impact resistance and platability. Thus, the compositions of the present invention provide superior industrial advantages.

We claim:

1. A thermoplastic resin composition comprising:
   (A) from 5 to 50 parts by weight of a graft copolymer obtained by graft polymerizing from 20 to 37 parts by weight of monomers comprising from 20 to 80% by weight of an α-alkyl aromatic vinyl monomer, from 3 to 40% by weight of an aromatic vinyl monomer containing no α-alkyl aromatic vinyl monomer, from 15 to 40% by weight of a vinyl cyanide monomer and from 0 to 35% by weight of a vinyl monomer copolymerizable with these monomers, to from 63 to 80 parts by weight of a diene rubber-like polymer, the total amount of the monomers and the rubber-like polymer being 100 parts by weight;
   (B) from 0 to 60 parts by weight of a copolymer obtained by polymerizing from 60 to 90% by weight of an aromatic vinyl monomer, from 10 to 40% by weight of a vinyl cyanide monomer and from 0 to 30% by weight of a vinyl monomer copolymerizable with these monomers; and
   (C) from 15 to 80 parts by weight of an aromatic polycarbonate resin;
   the total amount of components (A), (B) and (C) being 100 parts by weight.

2. The thermoplastic resin composition according to claim 1, wherein the diene rubber-like polymer for component (A) is selected from the group consisting of polybutadiene, a butadiene-styrene copolymer, a butadiene-acrylonitrile copolymer and a mixture thereof.

3. The thermoplastic resin composition according to claim 1, wherein the α-alkyl aromatic vinyl monomer for component (A) is α-methylstyrene or a halogenated α-methylstyrene.

4. The thermoplastic resin composition according to claim 1, wherein the aromatic vinyl monomer containing no α-alkyl aromatic vinyl monomer for component (A) is styrene or vinyltoluene.

5. The thermoplastic resin composition according to claim 1, wherein the vinyl cyanide monomer for component (A) or (B) is acrylonitrile or methacrylonitrile.

6. The thermoplastic resin composition according to claim 1, wherein the vinyl monomer copolymerizable with other monomers for component (A) or (B) is methyl methacrylate or ethyl methacrylate.

7. The thermoplastic resin composition according to claim 1, wherein the aromatic vinyl monomer for component (B) is styrene, α-methylstyrene or vinyltoluene.

8. The thermoplastic resin composition according to claim 1, wherein the polycarbonate resin of component (C) is obtained by reacting a dihydroxydiarylalkane with phosgene or a diester of carbonic acid.

9. The thermoplastic resin composition according to claim 8, wherein the dihydroxydiarylalkane is 4,4'-dihydroxy-2,2-diphenylpropane, tetramethyl bisphenol A or bis-(A-hydroxyphenyl)-p-diisopropyl benzene.

10. The thermoplastic resin composition according to claim 8, wherein from 0.2 to 2 mol % of the dihydroxydiarylalkane is substituted by a polyhydroxy compound selected from the group consisting of 1,4-bis-(4', 4,2'-dihydroxytriphenylmethyl)-benzene, fluoroglucinol, 4,6-dimethyl-2,4,6-tri-(4-hydroxyphenyl)heptene-2, 4,6-dimethyl-2,4,6-tri-(4-hydroxyphenyl)heptane, 1,3,5-tri-(4-hydroxyphenyl)-benzene, 1,1,1-tri(4-hydroxyphenyl)-ethane and 2,2-bis[4,4-(4,4'-dihydroxyphenyl)-cyclohexyl]-propane.

11. The thermoplastic resin composition according to claim 1, wherein compolymer (B) is present in an amount of 10 to 60 parts by weight.

12. The thermoplastic resin according to claim 1, wherein graft copolymer (A) is obtained by graft polymerizing about 30 parts by weight of said monomers to about 70 parts by weight of said diene rubber-like polymer.

* * * * *